(12) United States Patent
Yasuhara

(10) Patent No.: US 7,448,673 B2
(45) Date of Patent: Nov. 11, 2008

(54) SUBFRAME STRUCTURE OF VEHICLE

(75) Inventor: Shigeto Yasuhara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/801,606

(22) Filed: May 10, 2007

(65) Prior Publication Data
US 2007/0262577 A1 Nov. 15, 2007

(30) Foreign Application Priority Data
May 12, 2006 (JP) ............................... 2006-133710

(51) Int. Cl.
*B62D 21/02* (2006.01)
(52) U.S. Cl. ................................. 296/187.09
(58) Field of Classification Search ............ 296/187.03, 296/187.09; 293/102, 132
See application file for complete search history.

(56) References Cited

U.S. PATENT DOCUMENTS

| | | | | | |
|---|---|---|---|---|---|
| 3,883,166 | A | * | 5/1975 | Cadiou | ........................ 293/133 |
| 4,466,653 | A | * | 8/1984 | Harasaki | ................. 296/187.09 |
| 4,573,734 | A | * | 3/1986 | Gass | ...................... 296/187.09 |
| 5,100,189 | A | * | 3/1992 | Futamata et al. | ............. 293/132 |
| 6,578,904 | B1 | * | 6/2003 | Yvetot et al. | ............ 296/187.09 |
| 7,258,392 | B2 | * | 8/2007 | Frederick et al. | ........ 296/187.09 |
| 2003/0075377 | A1 | * | 4/2003 | Roehringer et al. | .......... 180/312 |
| 2007/0176443 | A1 | * | 8/2007 | Yasuhara et al. | ............. 293/133 |

FOREIGN PATENT DOCUMENTS

| | | |
|---|---|---|
| JP | 8156827 | 6/1996 |
| JP | 3188946 | 5/2001 |
| JP | 2002-211249 | 7/2002 |
| JP | 3578087 | 7/2004 |

* cited by examiner

*Primary Examiner*—H Gutman
(74) *Attorney, Agent, or Firm*—Carrier, Blackman & Associates PC; William D. Blackman; Joseph P. Carrier

(57) ABSTRACT

In a subframe structure at a lower front portion of a vehicle, the subframe structure includes a load input portion arranged between a front end of a side frame and a bumper beam, a load introducing portion extending rearwardly downward from the load input portion, and a body portion extending rearward from the load introducing portion. The load input portion, the load introducing portion and the body portion are continuously provided.

13 Claims, 4 Drawing Sheets

SUBFRAME STRUCTURE OF VEHICLE

The present invention claims priority from Japanese Patent Application No. 2006-133710 filed on May 12, 2006, the entire content of which is incorporated herein by reference.

BACKGROUND OF INVENTION

1. Field of the Invention

The present invention relates to a subframe structure of a vehicle.

2. Description of the Related Art

A subframe is provided below a side frame on a front side portion of a vehicle body. A steering gear box or a vehicle drive unit such as an engine may be mounted on the subframe, and the subframe supports a suspension.

In order to absorb an impact of a collision on a front side of the vehicle, there has been proposed a technique in which the subframe is downwardly bent at the time of collision. For example, Japanese Patent No. 3,188,946 discloses a forwardly ascending slope portion formed at a front part of a subframe, and a steering gear attached to the slope portion. In this configuration, when a head-on collision occurs, the slope portion of the subframe is moved to become close to vertical, whereby the steering gear attached to the slope portion is suitably moved downward.

According to a technique disclosed in Japanese Patent No. 3578087, when a collision load is input to a subframe by a forward-backward collision of a vehicle, the subframe is bent and deformed in a V shape around a middle portion thereof, whereby a power unit moves downwardly with respect to a vehicle body. In addition, a mounting chamber is connected to an upper portion of the power unit with a rod. Thus, the collision load is input to the upper portion of the power unit, whereby the power unit is rotated around a lower portion connecting point in a front-and-rear direction. Consequently, the shortest distance between the power unit and a partition wall increases as compared with a state before the collision. Therefore, a crushing stroke in the front-and-rear direction can be increased without increasing the entire length of the mounting chamber.

According to the disclosures of Japanese Patent No. 3188946 and Japanese Patent No. 3578087, the subframe is fixed to a lower surface of a side frame with a bolt. In this case, a collision load input to a bumper beam is transmitted to the subframe through the side frame. Also, there is a fear that a slip may occur between attaching surfaces of the side frame and the subframe. Therefore, it is difficult to efficiently transmit the load to the subframe. Accordingly, there is a problem that it is difficult to control a crushing mode of the subframe at the time of collision of a vehicle.

SUMMARY OF INVENTION

It is an object of the invention to provide a subframe structure by which a crushing mode can be easily controlled.

According to one or more aspects of the invention, in a subframe structure at a lower front portion of a vehicle, the subframe structure includes a load input portion arranged between a front end of a side frame and a bumper beam, a load introducing portion extending rearwardly downward from the load input portion, and a body portion extending rearward from the load introducing portion. The load input portion, the load introducing portion and the body portion are continuously provided.

DETAILED DESCRIPTION

Figure 1:
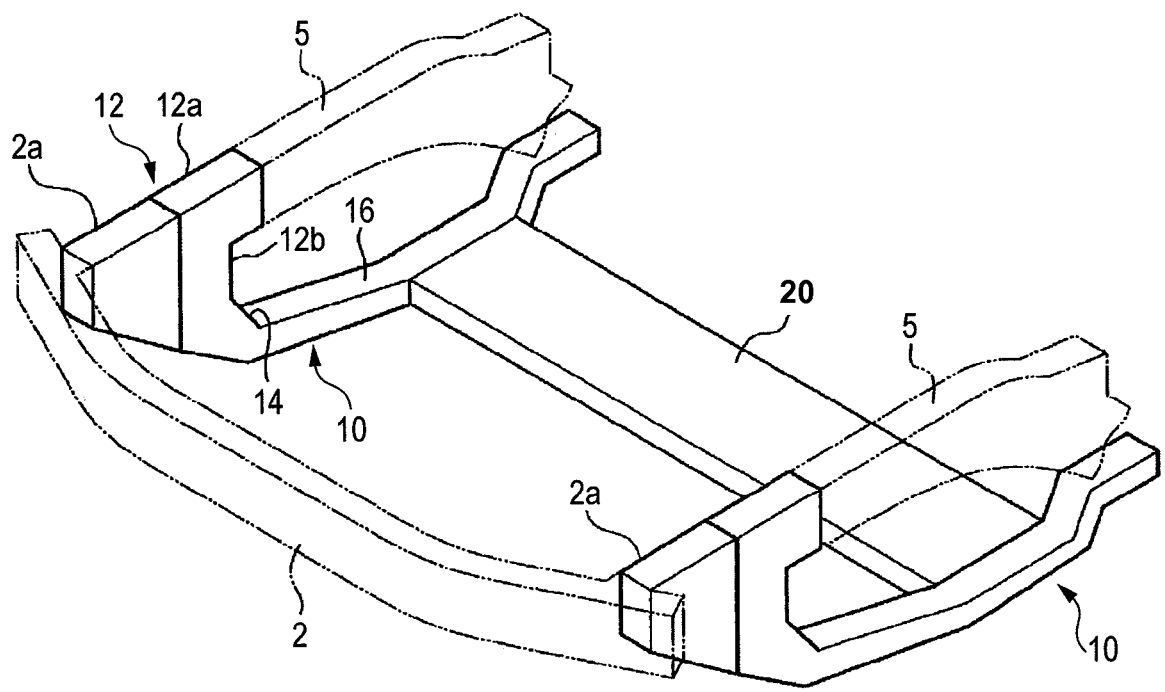
FIG. 1 is a perspective view showing a subframe structure according to an exemplary embodiment of the invention.

Hereinafter, an exemplary embodiment of the invention will be described in detail with reference to the drawings. FIG. 1 is a perspective view showing a subframe structure according to the invention. A bumper beam 2 extending in a right-and-left direction of a vehicle is disposed at a front end portion of the vehicle. Side frames 5 are provided so as to extend from vicinities of respective ends of the bumper beam 2 toward a rear side of the vehicle. Subframes 10 according to the exemplary embodiment are disposed below respective front portions of the side frames 5. The subframes 10 provided on respective sides of the vehicle are formed to have substantially the same shape.

Each of the subframes 10 is formed to have a closed cross-section or an open cross-section by pressing, bending, and welding a steel plate, or by hydroforming. Hydroforming is a method including mounting a steel pipe material in a mold, and subsequently applying a high hydrostatic pressure inside the steel pipe material, thereby forming the steel pipe material into a shape of the mold. Hydroforming allows a low cost forming even in a case where a subframe structure is complex.

Each of the subframes 10 according to the exemplary embodiment includes a load input portion 12, a load introducing portion 14, and a body portion 16, which are continuously provided. The load input portion 12, the load introducing portion 14 and the body portion 16 may be formed in a one-piece structure. Further, at least one of the load input portion 12, the load introducing portion 14 and the body portion 16 may be formed by hydroforming. The load input portion 12 and the load introducing portion 14 may be formed by hydroforming. In such cases, an impact of a collision is less absorbed than a case where the load input portion 12 and the load introducing portion 14 are formed by press working.

The load input portion 12 is arranged between a front end portion of the side frame 5 and an attaching portion 2a of the bumper beam 2. The load input portion 12 includes a horizontal part 12a which is formed so as to extend from the front end portion of the side frame 5, and a vertical part 12b which is formed along a front surface of the attaching portion 2a of the bumper beam 2. A front end surface of the side frame 5 is in a surface-contact with and is fixed to a rear surface of the horizontal part 12a of the load input portion 12. The bumper beam 2 and the attaching portion 2a attach to a front, vertically extending surface of the load input portion 12 of the subframe such that the attaching portion 2a has an upper surface which is planar with an upper surface of the side frame 5 and a lower surface which tapers rearwardly downwardly to have an increasingly larger vertical dimension. The rear surface of the attaching portion 2a of the bumper beam 2 is in a surface-contact with and is fixed to a front surface of the vertical part 12b of the load input portion 12. A vertical dimension of a contacting portion between the rear surface of the attaching portion 2a and the front surface of the vertical part 12b is longer than half of a vertical distance between a lowermost portion of the side frame 5 and an uppermost portion of the body portion 16 at a front end of the side frame.

The load introducing portion 14 is arranged so as to extend in a rearwardly downward direction of the vehicle from a lower end of the vertical part 12b of the load input portion 12. The cross-sectional shape of the load introducing portion 14 may be either constant or continuously varied. The body portion 16 is arranged so as to extend in a rearward direction of the vehicle from a lower end of the load introducing portion 14. The body portion 16 is formed into a shape in which a central portion in a longitudinal direction thereof is downwardly bent, so that a crushing mode (a bending direction) at the time of collision of the vehicle is constant. A rear end part of the body portion 16 is connected to an inclined portion of the side frame 5 where the frame 5 is extended in the rearward direction of the vehicle and where the body portions have a smaller vertical dimension than that of the side frames. The body portions 16 of the subframes 10 disposed on respective sides of the vehicle are connected to each other via member 20.

Figure 2A:
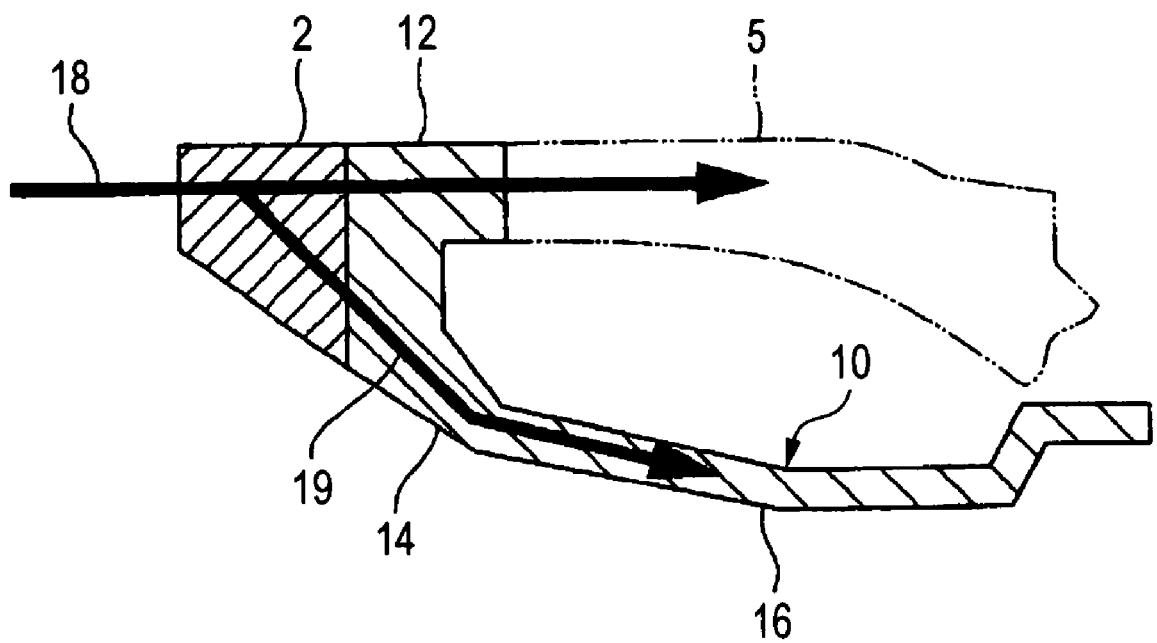
FIGS. 2A and 2B are explanatory views showing load transmission paths, through which a load is transmitted to the subframe at a time of a front collision of a vehicle.
Figure 2B:
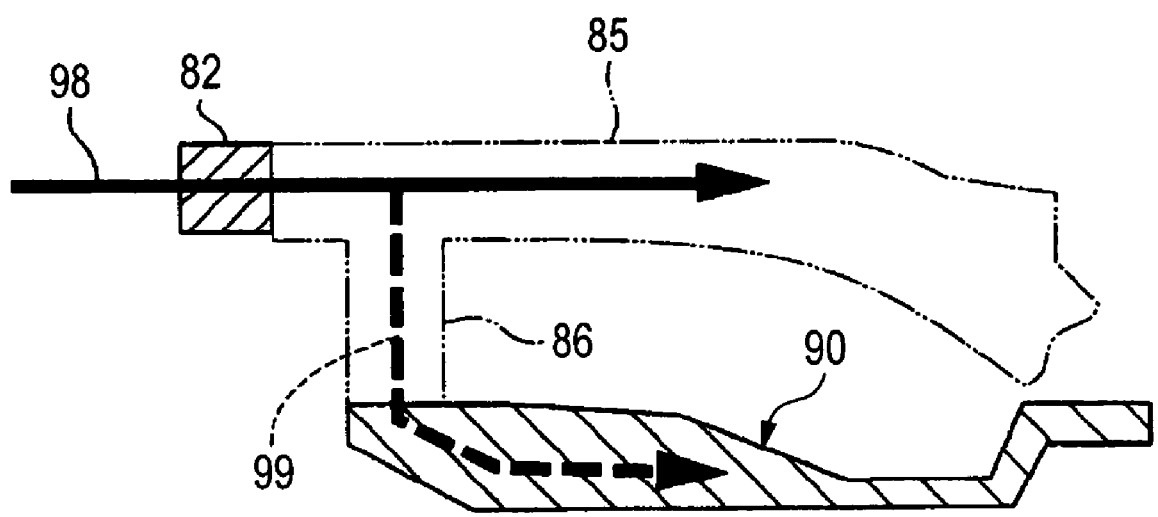

FIGS. 2A and 2B are explanatory views showing load transmission paths through which a load is transmitted to the subframe, at the time of a front collision of the vehicle. FIG. 2A shows a subframe structure according to the exemplary embodiment. FIG. 2B shows a subframe structure according to a related art. According to the related art shown in FIG. 2B, a bumper beam 82 is securely fixed to a front end of a side frame 85. A subframe 90 is horizontally disposed below the side frame 85. A front end portion of the subframe 90 is connected to a lower end of a stay 86 which extend downwardly from the side frame 85. A rear end portion of the subframe 90 is connected to an inclined portion of the side frame 85.

According to the subframe structure of the related art described above, a load 98 at the time of front collision of the vehicle is mostly transmitted to the side frames 85 from the bumper beam 82. Thus, the load 98 from a front side of the vehicle is difficult to be distributed, whereby a load 99 transmitted to the subframe 90 through the stay 86 of the side frame 85 is small. Accordingly, it is difficult to control the crushing mode of the subframe 90 at a time of a high-speed collision.

Compared with this, in the subframe structure of the exemplary embodiment shown in FIG. 2A, a load 18 at the time of a front collision of the vehicle is input to the load input portion 12 of the subframe 10 from the bumper beam 2. The input load 18 is transmitted to the load introducing portion 14, which extends in the rearwardly downward direction from the load input portion 12, in addition to the side frames 5. Thus, the subframe structure according to the exemplary embodiment facilitates the distribution of the load transmitted from the front side of the vehicle, whereby the load 19 transmitted from the body portion 16 extending rearwardly from the load introducing portion 14 increases. Accordingly, the crushing mode of the subframe 10 at the time of a high-speed collision can be easily controlled.

Figure 3A:
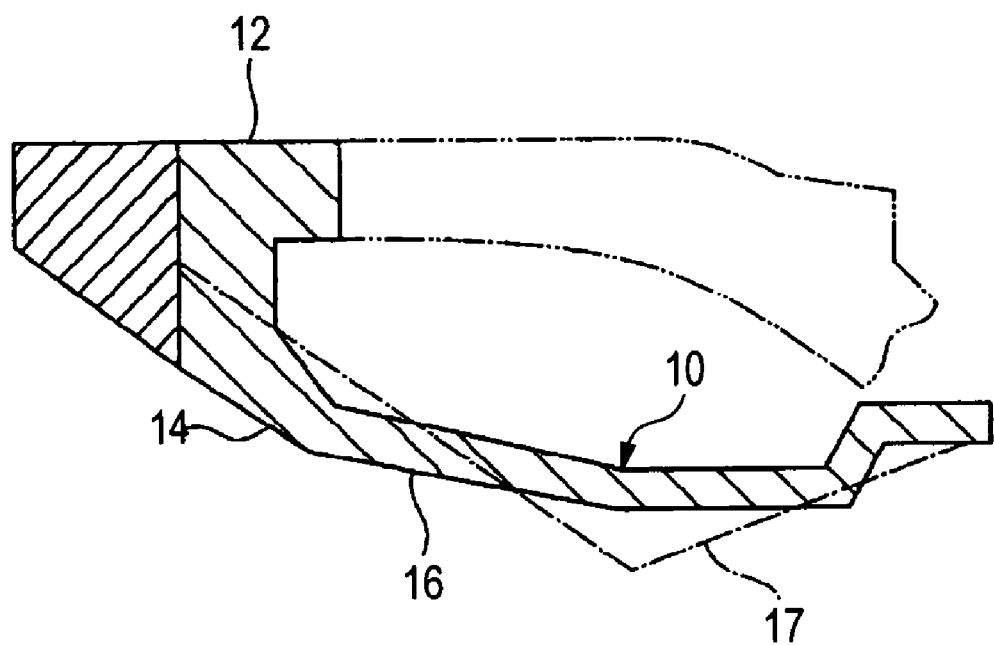
FIGS. 3A and 3B are explanatory views showing crushing modes at the time of a front collision of the vehicle.
Figure 3B:
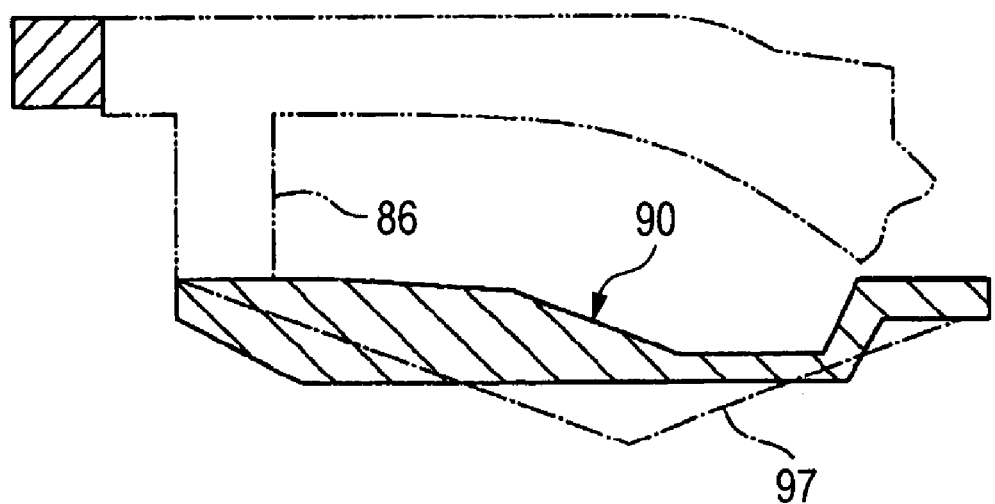

FIGS. 3A and 3B are explanatory views showing crushing modes at the time of a front collision of the vehicle. FIG. 3A shows a subframe structure according to the exemplary embodiment. FIG. 3B shows a subframe structure according to the related art. According to the related art shown in FIG. 3B, the load transmitted to the subframe 90 at the time of a front collision of the vehicle is small. Thus, it is necessary to reduce strength of the subframe 90 in order to deform the subframe 90. On the other hand, it is necessary to assure a strength of the subframe 90 required for mounting a steering gear box or to supporting a suspension. Moreover, a load transmitted to the subframe 90 through the stay 86 acts thereupon in a direction in which the subframe 90 is compressed (or buckled). Therefore, it is difficult to control the crushing mode 97 of the subframe 90.

Compared with this, in the subframe structure according to the exemplary embodiment shown in FIG. 3A, a load transmitted to the subframe 10 at the time of a front collision of the vehicle is large. In addition, the load is transmitted to the body portion 16 through the load introducing portion 14 extending rearwardly downward from the load input portion 12. Thus, a bending moment acts on the body portion 16 of the subframe 10. This enables the body portion 16 to undergo a downward bending deformation. Consequently, the crushing mode 17 of the subframe 10 can be easily controlled.

Figure 4A:
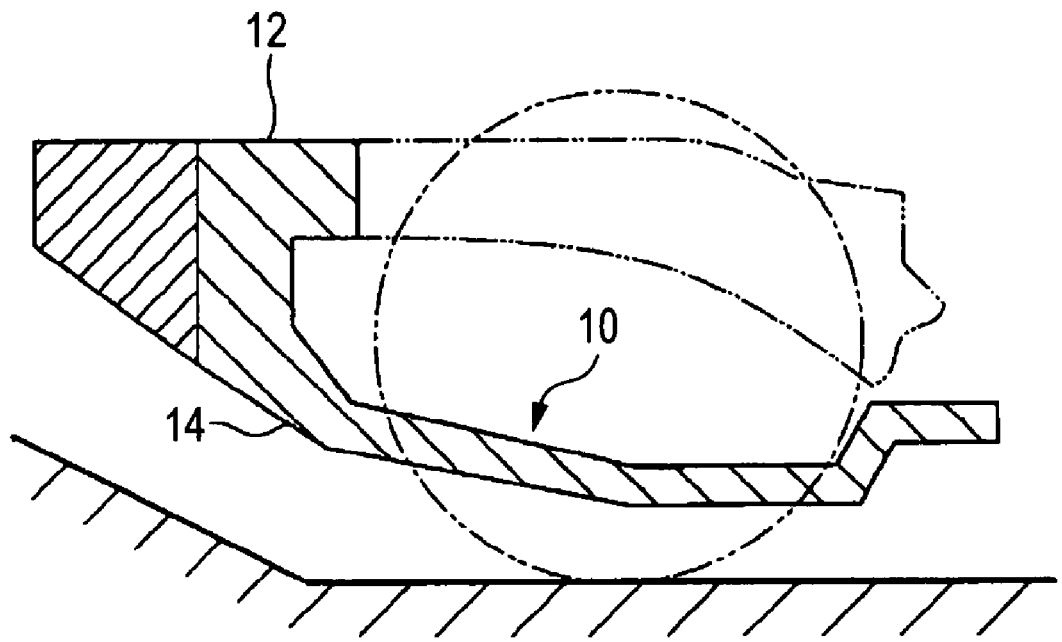
FIGS. 4A and 4B are explanatory views showing a comparison between the subframe structure according to the exemplary embodiment and an alternative configuration of the subframe structure according to the related art.
Figure 4B:
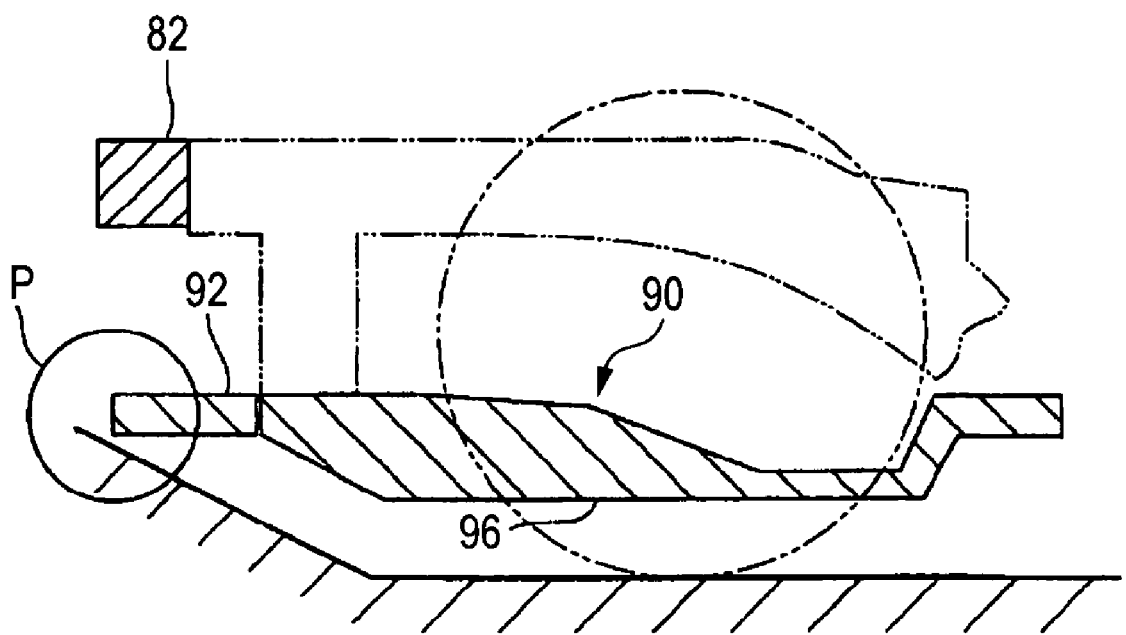

Meanwhile, as shown in FIG. 4B, a load input portion 92 may be provided at a front end of a body portion 96 of the subframe 90 in order to control the crushing mode of the subframe of the related art. In this case, a load at the time of a front collision of the vehicle is input to the load input portion 92 in addition to the bumper beam 82. Consequently, the crushing mode of the subframe 90 can be controlled. However, because the load input portion 92 is provided at a lower front end portion of the vehicle, there is a fear that between the load input portion 92 may contact the ground when the vehicle goes up a slope (see a region P in FIG. 4B).

Compared with this, the subframe structure according to the exemplary embodiment shown in FIG. 4A has the load introducing portion 14 extending rearwardly downward from the load input portion 2a. Thus, the subframe 10 can be prevented from touching the ground when the vehicle goes up a slope.

As described above, according to the exemplary embodiment shown in FIG. 2A, the subframe structure includes the load input portions 12 each arranged between the front end of the side frames 5 on respective sides and the bumper beam 2, the load introducing portions 14 each extending rearwardly downward from the respective load input portions 12, and the body portions 16 disposed substantially parallel to the respective side frames 5. The load input portion 12, the load introducing portion 14 and the body portion 16 are continuously provided in a front-and-rear direction of a vehicle body. With this configuration, the load 18 at the time of a front collision of the vehicle is input to the load input portions 2a from the bumper beam 2, and is transmitted to the load introducing portions 14 in addition to the side frames 5. The load 18 at the time of front collision is distributed in this manner, whereby the load 19 transmitted to the body portions 16 of the subframe 10 increases. Therefore, the crushing mode of the subframe can be easily controlled. Consequently, the crushing stroke at the time of a front collision of the vehicle can be assured, thereby preventing an impact of a collision from being exerted on a driver or a passenger.

While description has been made in connection with an exemplary embodiment of the present invention, it will be obvious to those skilled in the art that various changes and modification may be made therein without departing from the present invention. It is aimed, therefore, to cover in the appended claims all such changes and modifications falling within the true spirit and scope of the present invention.

What is claimed is:

1. A subframe structure at a lower front portion of a vehicle, the subframe structure comprising:

a load input portion arranged between a front end of a side frame and a bumper beam;

a load introducing portion extending rearwardly downward from the load input portion; and a body portion extending rearward from the load introducing portion, wherein the load input portion, the load introducing portion and the body portion are continuously provided, and wherein the load input portion, the load introducing portion and the body portion are formed as a one-piece structure.

2. The subframe structure according to claim 1, wherein at least one of the load input portion, the load introducing portion and the body portion is formed by hydroforming.

3. The subframe structure according to claim 2, wherein the load input portion and the load introducing portion are formed by hydroforming.

4. The subframe structure according to claim 1, wherein a vertical dimension of a contacting portion between the bumper beam and the load input portion is longer than half of a vertical distance between a lowermost portion of the side frame and an uppermost portion of the body portion at a front end of the side frame.

5. The subframe structure according to claim 1, wherein the load input portion comprises:

a horizontal part having a rear surface which is in contact with a front end surface of the side frame; and a vertical part having a front surface which is in contact with the bumper beam.

6. The subframe structure according to claim 1, wherein cross-sectional shape of the load introducing portion is continuously varied.

7. The subframe structure according to claim 1, wherein a central portion of the body portion in a longitudinal direction thereof is downwardly bent.

8. The subframe structure according to claim 1, wherein the load introducing portion extends in a rearwardly downward direction of the vehicle from a lower end of a vertically extending portion of the load input portion.

9. The subframe structure according to claim 1, wherein a rear end of the body portion is connected to an inclined portion of the side frame wherein the side frame is extended in a rearward direction of the vehicle.

10. The subframe structure according to claim 1, wherein the bumper beam includes an attaching portion attached to a front, vertically extending surface of the load input portion of the subframe, and the attaching portion has an upper surface which is substantially planar with an upper surface of the side frame and a lower surface which tapers rearwardly downwardly to have an increasingly larger vertical dimension.

11. The subframe structure according to claim 1, wherein the body portion has a smaller vertical dimension than that of the side frame.

12. A subframe structure at a lower front portion of a vehicle, the subframe structure comprising:

a load input portion arranged between a front end of a side frame and a bumper beam;

a load introducing portion extending rearwardly downward from the load input portion;

a plurality of body portions extending rearward from the load introducing portion, wherein the load input portion, the load introducing portion and the body portions are continuously provided, a vertically extending transverse connecting member which connects the body portions of the subframe, and wherein an upper surface of the side frame and the load input portion are substantially planar.

13. The subframe structure according to claim 12, wherein the bumper beam includes an attaching portion attached to a front, vertically extending surface of the load input portion of the subframe, and the attaching portion has an upper surface which is substantially planar with an upper surface of the side frame and a lower surface which tapers rearwardly downwardly to have an increasingly larger vertical dimension.

* * * * *